United States Patent [19]

Hoch et al.

[11] 3,976,160

[45] Aug. 24, 1976

[54] DEVICE FOR THE ATTENUATION OF NOISE EMISSION BY THE JET PIPES OF JET ENGINES

[75] Inventors: René Gérard Hoch, La Rochette; Michel Henri Julliand, Melun, both of France

[73] Assignee: Societe Nationale d'Etude et de Construction de Moteurs d'Aviation, Paris, France

[22] Filed: Aug. 30, 1974

[21] Appl. No.: 502,200

[30] Foreign Application Priority Data
Aug. 31, 1973  France .............................. 73.31580

[52] U.S. Cl. ...................... 181/33 HD; 239/265.13; 239/265.39
[51] Int. Cl.² ......................................... B64D 33/06
[58] Field of Search ...... 181/33 HB, 33 HC, 33 HD; 239/265.11, 265.13, 265.19, 265.27, 265.31, 265.33, 265.35, 265.37, 265.39

[56] References Cited
UNITED STATES PATENTS

| | | |
|---|---|---|
| 3,615,052 | 10/1971 | Tumavicus ..................... 239/265.39 |
| 3,706,353 | 12/1972 | Ffowces-Williams et al.. 181/33 HC |
| 3,820,626 | 6/1974 | Bonneaud et al. ............. 181/33 HC |
| 3,837,579 | 9/1974 | Camboulives et al. .... 239/265.37 X |

FOREIGN PATENTS OR APPLICATIONS

| | | |
|---|---|---|
| 874,496 | 8/1961 | United Kingdom ............ 181/33 HC |

*Primary Examiner*—John Gonzales
*Attorney, Agent, or Firm*—William J. Daniel

[57] ABSTRACT

A device for the attenuation of the noise emitted by a jet pipe of a jet engine and especially a composite jet pipe of an aircraft jet engine, by pinching of the jet with the aid of opposite panels causing spreading of the jet in one plane, so that a silencer effect is manifested in this plane, these panels being in a retracted position at rest, wherein the pinching of the jet is adapted to be effected in at least one lateral part of the jet with the aid of at least one pair of mutually facing panel elements situated on either side of the plane of spread of the jet.

4 Claims, 9 Drawing Figures

FIG.:1
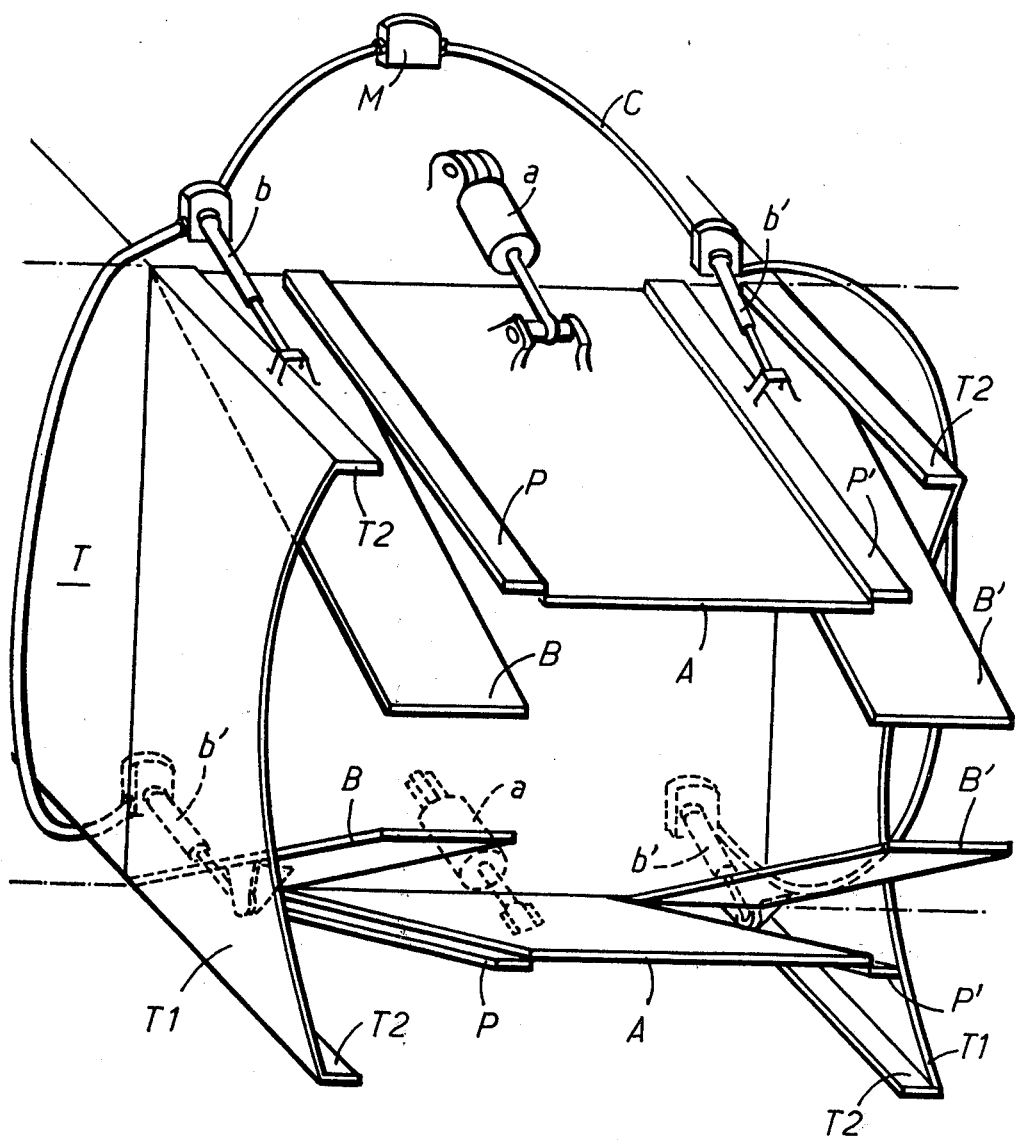
FIG.:1a
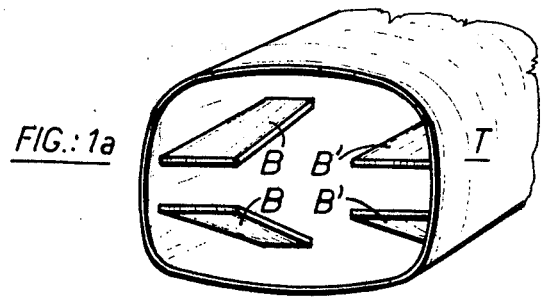

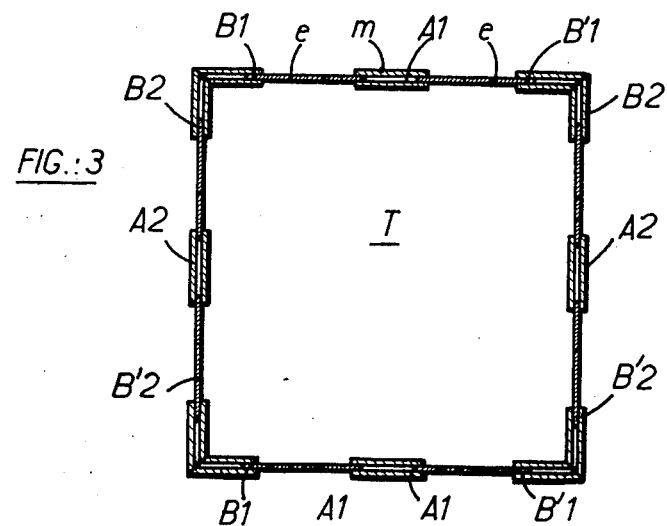
FIG.:3
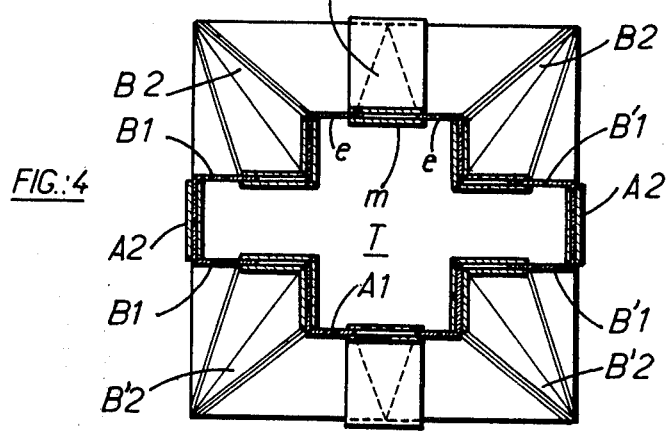
FIG.:4
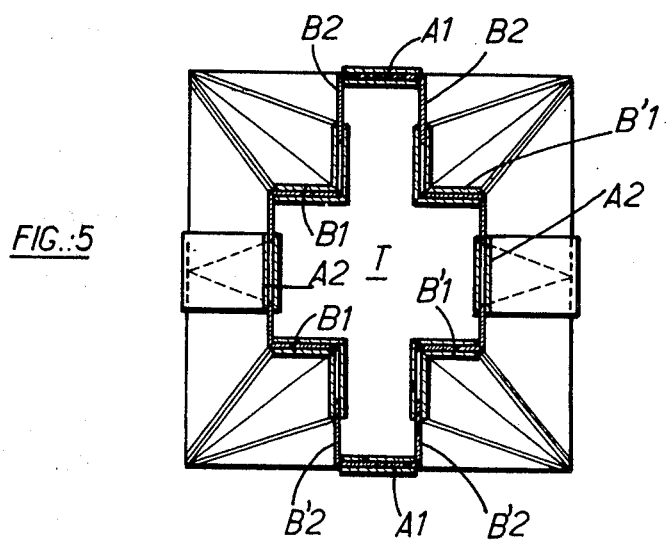
FIG.:5

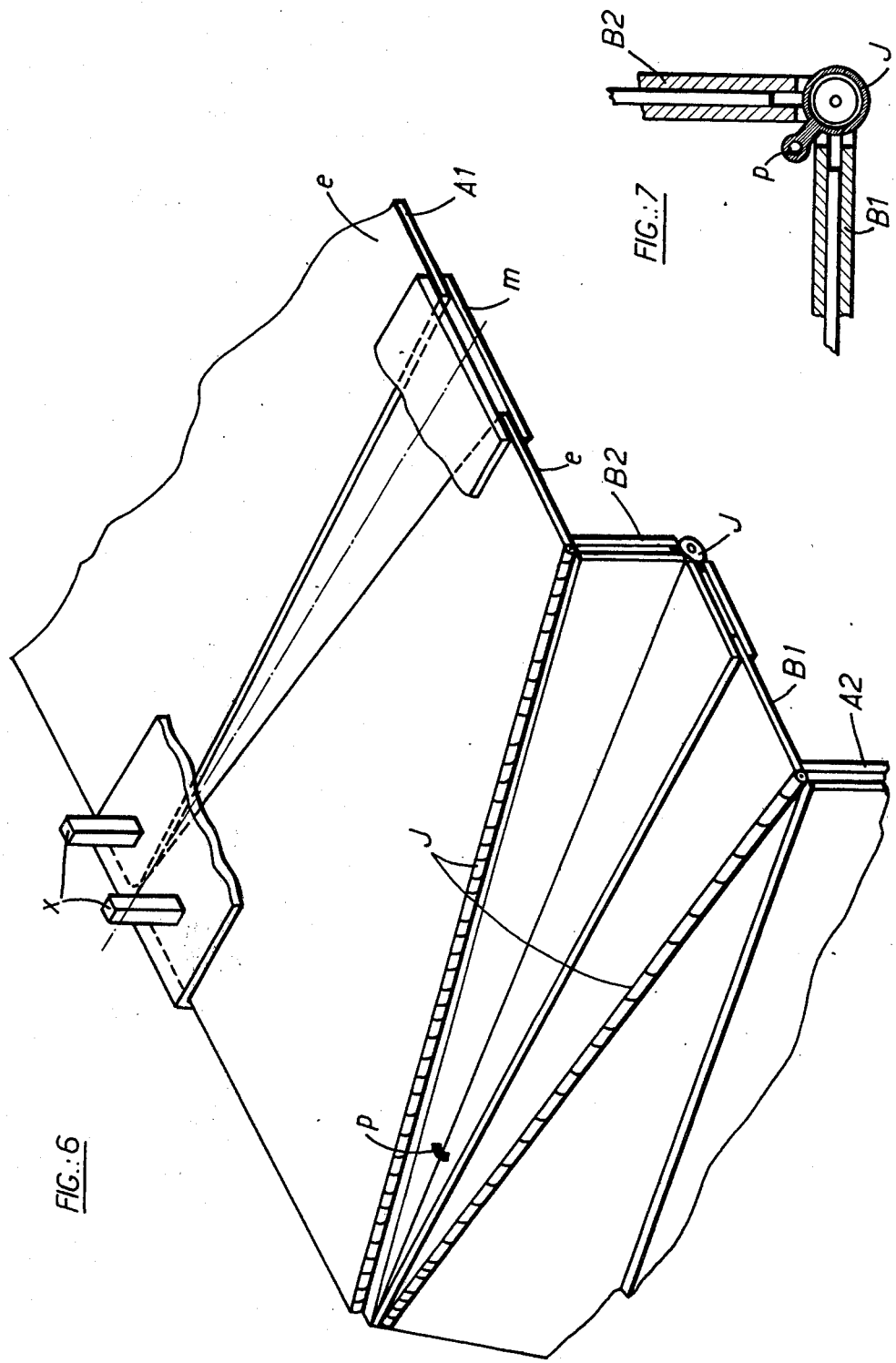

DEVICE FOR THE ATTENUATION OF NOISE EMISSION BY THE JET PIPES OF JET ENGINES

BACKGROUND OF THE INVENTION

Bonneaud et al U.S. Pat. No. 3,820,626 describes a manner of attenuating, in a selected preferred plane, the noise generated by jet engines and more especially by jets of what is called supercritical flow issuing from composite jet pipes by pinching such jets with the aid of two opposite panels, normally retracted during cruising flight but which can be deflected into a position where they pinch the jet and therefore its spreading in the said preferred plane where it is desired to obtain attenuation of the noise. In an advantageous example of the above which derives from the usefulness of being able to pass as desired from a silencer effect in the horizontal plane during the take-off period to a silencer effect in the vertical plane during flight over inhabited regions for example at the approaches to aerodromes, two orthogonal pairs of constricting panels are arranged each having its own control permitting the selective utilisation of one or the other of the said pairs in order to spread the jet into the desired one of the two orthogonal planes.

The object of the present invention is inter alia to effect the reduction of the losses occasioned by the use of constricting panels, while improving the degree of attenuation of the noise in the plane of spread of the jet.

SUMMARY OF THE INVENTION

According to the present invention the spread of the jet in a plane is obtained by the pinching of at least one lateral symmetrical part of the jet with the aid of at least one pair of mutually opposite panel elements situated on either side of the said plane.

Symmetrical pinching of the lateral parts of the jet can be carried out with the aid of two pairs of panel elements disposed symmetrically on either side of the axis of the jet.

In comparison with the arrangement ensuring the pinching of the central part of the jet, the invention offers the advantage of requiring less forces and of involving smaller losses of thrust.

According to a variation of the present invention, a constriction of the central part and a constriction of the lateral parts of the jet are combined, the spread of the jet in one plane being effected by pinching at different geometric levels of the jet, with the aid of several pairs of panel elements facing one another and situated on either side of the plane of spread of the jet, the facing panel elements having different spacings according to their position in relation to the axis of the jet, thus in a way effecting a staged pinching: a first constriction which involves the central part of the jet and a second constriction which affects only the lateral parts thereof and is advantageously more accentuated than the first constriction of the central part.

By the combination of a relatively slight pinching of the central part of the jet and a greater pinching on the lateral parts of the jet it is seen that one thus retains the advantages of reduction of forces and of smaller losses of thrust proper to the object of the present invention.

It has further been observed that the action of the complementary elements for lateral pinching of the jet causes a greater opening out thereof in the plane of spread and a reduction of the angle of spread of the jet in the orthogonal plane, translated by a greater reduction of the noise in the preferred direction. Two factors contribute to the reinforcement of the silencer effect: On the one hand a very clear opening out of the mixing zones and on the other an appreciable shortening of the central supersonic core connected with a very clear attenuation of the structure of shock waves, which substantially reduces the noise deriving from the interaction of the shock waves and the turbulence etc., commonly called "shock wave noise". In fact the shock wave system is completely disorganised, only the shock waves of low intensity remain in a zone situated in the immediate proximity of the jet pipe outlet.

Although the staged pinching according to the present invention can be carried out by means of two monobloc rigid panels of suitable profile to present central portions retracted in relation to lateral portions, it is preferable to separate the lateral elements from the central elements and to provide separate controls for the first and the second, in order to permit a total retraction in cruising, the central and lateral elements then being more or less at level, while in the silenced running rate the lateral elements can be more greatly deflected than the central ones.

The present invention also provides an arrangement comprising two orthogonal sets of staged constriction elements which can be put into use selectively according to whether it is desired to obtain a horizontal or a vertical silencer effect.

BRIEF DESCRIPTION OF THE DRAWINGS

The invention will now be further described, by way of example, with reference to the accompanying drawings, in which:

FIG. 1 is a diagrammatic perspective view of a simplified form of embodiment of the present invention producing an improved silencer effect in one single plane, FIG. 1a shows a variant diagrammatically in perspective;

FIGS. 3, 4 and 5 are diagrammatic end views of this variant of embodiment illustrating respectively the cruising configuration, the take-off configuration and the over-flight configuration;

FIG. 6 is a fragmentary perspective view on a larger scale of the mechanical relationship of the various panel elements;

FIG. 7 is a sectional view on a still larger scale of a detail of FIG. 6; and

DESCRIPTION OF PREFERRED EMBODIMENTS

Figure 2:
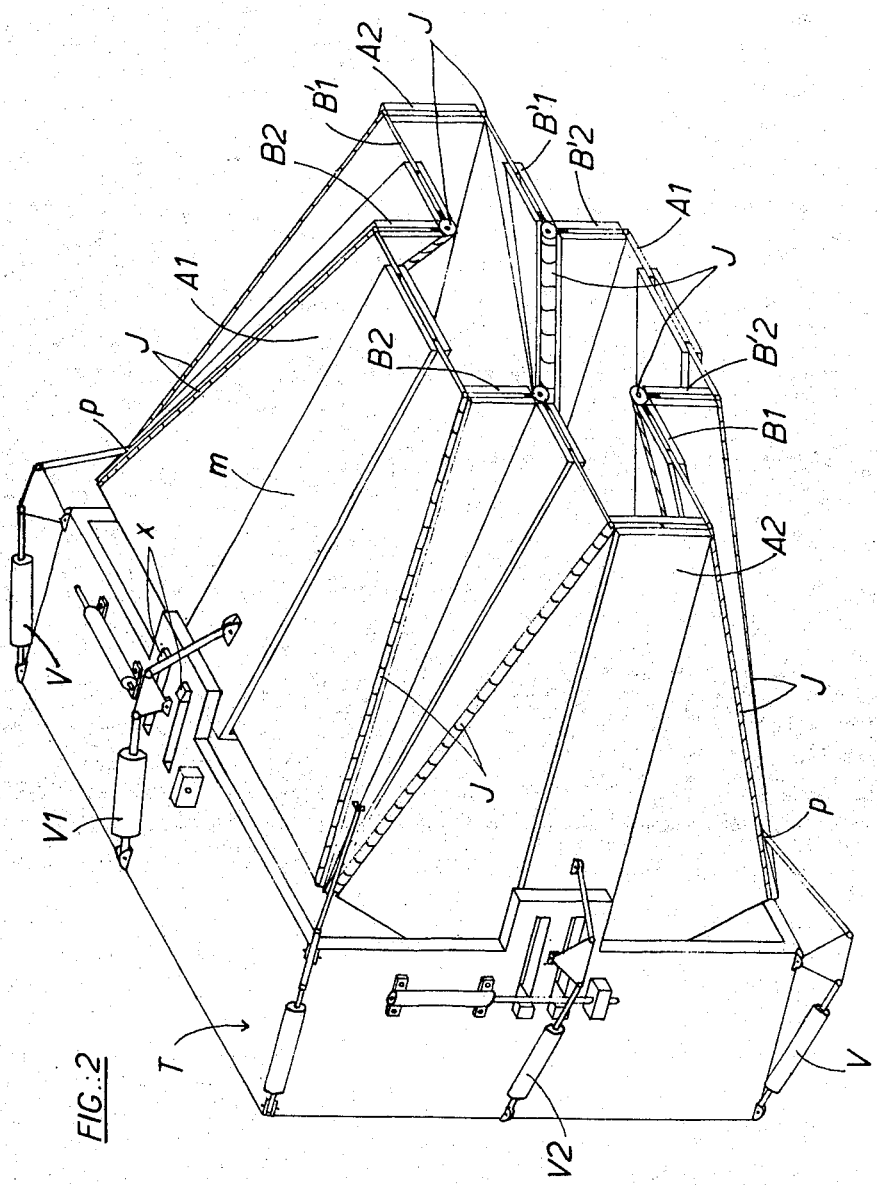
FIG. 2 is an analogous view of a variant of embodiment permitting of obtaining the silencer effect according to choice in one or the other of two orthogonal planes.

The drawings relate to a two-dimensional jet pipe T equipped with opposite panels which can be deflected inwards to pinch the jet when it is desired to attenuate the noise thereof, in the plane of spread of the jet consecutive to its constriction, or be retracted into the wall of the terminal divergent of the secondary passage of the jet pipe when the silencer effect is unnecessary, in particular in cruising flight.

FIG. 1 represents a simplified form of embodiment designed for spreading the jet only in the horizontal plane, the vertical walls of the jet pipe T being fast with terminal fixed opposite parts T1 terminating above and below with flanges T2 turned towards the interior.

Mutually facing juxtaposed panels are on the other hand articulated to the horizontal walls of the jet pipe T: principal panels A—A occupying a central position and controlled by jacks a-a, and on either side of these auxiliary panels B—B and B'—B' occupying lateral positions and controlled respectively by jacks b-b and b'—b'. The assembly of the jacks, which can be pneumatic, is controlled by a common motor M which effects the synchronisation of the controlling of the panels through flexible interconnection conduits C.

It will be noted that in the working position (panels deflected to constrict the jet), the lateral auxiliary panels B—B and B'—B' are more greatly deflected than the central principal panels A—A. In the rest position (retracted panels fitting into the fixed profile of the jet pipe), the lateral auxiliary panels B—B and B'—B' are in abutment on the one hand against the turned-over flanges T2 of the fixed terminal parts T1 of the jet pipe T and also against retracted bearing surfaces P-P' along the longitudinal edges of each central panel A, the principal panels A—A and the auxiliary panels B—B and B'—B' then being at one level.

As a variant one could provide only the lateral panels B—B, B'—B', or only one of the pairs B—B or B'—B', of lateral panels, then effecting the attenuation of the noise only on one side of the jet pipe.

Thus diagrammatically in FIG. 1a there is represented the terminal part T of a jet pipe comprising only two pairs of lateral panels B—B, B'—B' which pinch only the lateral parts of the jet.

The lateral panels of any appropriate form can be regulatable in position or fixed so that in the latter case they pinch the jet and effect attenuation of the noise permanently.

The principle of the arrangement as illustrated in FIG. 1 finds an interesting application in the case of a secondary jet pipe equipped with a pair of "eyelids" effecting regulating of the section of the jet pipe.

In such an application, the first constriction exerted upon the central part of the jet will be effected by the "eyelids" themselves. The second constriction affecting the lateral parts of the jet is effected by lateral auxiliary panels disposed on the internal wall and in the vicinity of the junction line of the "eyelids". Each pair of opposite lateral auxiliary panels has a deflection angle substantially greater than that of the "eyelids" and sufficiently large dimensions to intercept a significant part of the primary jet. In order to avoid possible losses of thrust during flight phases where the noise reduction is not necessary, these lateral auxiliary panels can further be rendered retractable into the walls of the "eyelids".

The variant according to FIGS. 2 to 8 is more elaborate, the various panels for pinching of the jet of the previous embodiment being divided into two and arranged to constitute two sets of staged pinching panels at 90° to one another. More precisely here are provided on the one part principal central panels A1—A1 which are horizontal and A2—A2 which are vertical, and on the other part lateral auxiliary panels B1—B1 and B'1—B'1 which are horizontal and B2—B2 and B'2—B'2 which are vertical. The various panels are composed of plates which can slide with superposition in relation to one another, as shown in the drawings, the successive panels being further articulated at their junction by hinges J so as to permit the selection of the desired configuration: cruising configuration with retracted panels giving a jet pipe of square section (see FIG. 3), take-off function configuration with spreading of the jet in the horizontal plane giving a cruciform jet pipe with longer horizontal arms (see FIGS. 2 and 4) and finally over-flight configuration with spreading of the jet in the vertical plane giving a cruciform jet pipe with longer vertical arms (see FIG. 5).

It will be noticed especially (see especially FIGS. 2 and 6) that the sliding plates with superposition composing the central principal panels have a middle element $m$ forming a slideway for two extreme elements $e$ articulated on axes $x$ and forming sliders which come to abut against one another in the retracted position. This abutment limits the movement of the assembly and determines the cessation of the deformation of the jet pipe in the desired working configuration (with spreading of the jet in the horizontal plane or the vertical plane). The sliding plates with superposition composing the lateral auxiliary panels can be reduced to two elements, one forming the slideway and the other the slider and an analogous abutment is manifested in the retracted position at the same time moreover as the above abutment of the extreme constituent elements $e$ of the central principal panels.

Figure 8:
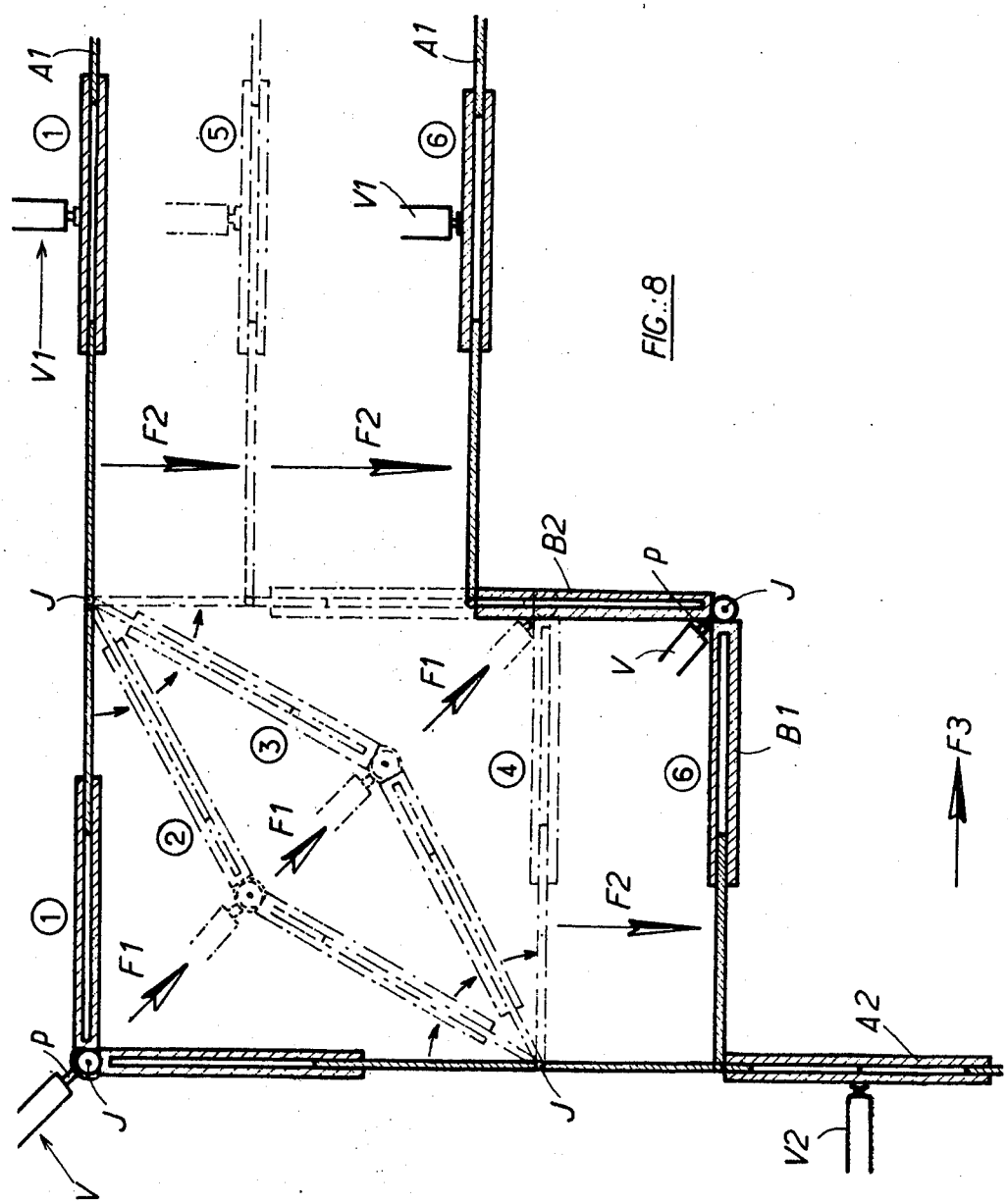
FIG. 8 illustrates the manner of control thereof.

The configuration control is effected easily with the aid of angle jacks V and central jacks V1 and V2 (see FIGS. 2 and 8). If one starts from the square cruising configuration as represented in FIG. 3 and at (1) in FIG. 8, it is seen that by the utilisation of the angle jacks V in the direction of arrows F1 it is possible to pass through various intermediate positions represented at (2) and (3) in FIG. 8 to a cruciform configuration represented at (4). Thence the central jack V1, acting in the direction of the arrows F2, will cause a vertical crushing of the cruciform configuration, passing through the intermediate position (5) to terminate at the configuration (6) where the jet is spread in the horizontal plane, likewise represented in FIG. 4. If on the other hand one wanted the other working configuration spreading the jet in the vertical plane (FIG. 5), one would act analogously in the direction of the arrow F3 in FIG. 8 by means of the other central jack V2.

It will be noted that the angle jacks V are linked to an attachment point $p$ provided on the hinges J, as is seen better in FIG. 7 which shows the detail encircled in FIG. 6 on an enlarged scale.

We claim:

1. A jet nozzle system for a jet propulsion engine comprising the combination of:
   i. a nozzle wall aerodynamically designed to form a tapering primary central passage for emitting a central major gaseous jet portion about a nozzle axis,
   ii. a first pair of opposite generally planar side panels (B1,B1) adjustable for inclination towards each other at a minor and at a major taper angles and positioned in a laterally offset location with respect to said nozzle axis, to form an over-tapering secondary lateral passage for emitting a lateral minor gaseous jet portion displaced sidewise from said nozzle axis, whereby said lateral minor gaseous jet portion is pinched compared with said central major gaseous jet portion,
   iii. a second pair of opposite generally planar side panels (B2,B2) arranged at substantially 90° with respect to said first pair of panels, said second pair of panels being adjustable for inclination towards each other at a minor and at a major taper angles and positioned in a laterally offset location with respect to said nozzle axis, to form an overtapering secondary lateral passage for emitting a lateral minor gaseous jet portion displaced sidewise from said nozzle axis, whereby said lateral minor gaseous jet portion is pinched compared with said central major gaseous jet portion, and iv. panel control means for selectively adjusting said first and second pairs of panels simultaneously either to said minor taper angle of the first pair and major taper angle of the second pair or to said major taper angle of the first pair and minor taper angle of the second pair.

2. A system as claimed in claim 1, further comprising:

v. a third pair of opposite generally planar side panels (B'1,B'1) symmetrical about said nozzle axis to said first pair of panels (B1,B1) and thereby positioned in a likewise laterally offset location with respect to said nozzle axis on the side thereof opposite to that of said first pair, said first and third pairs of panels being simultaneously adjustable for inclination at either said minor tapering angle or said major tapering angle, and vi. a fourth pair of opposite generally planar side panels (B'2,B'2) symmetrical about said nozzle axis to said second pair of panels (B2,B2) and thereby positioned in a likewise laterally offset location with respect to said nozzle axis on the side thereof opposite to that of said second pair, said second and fourth pairs of panels being simultaneously adjustable for inclination at either said minor tapering angle or said major tapering angle.

3. A system as claimed in claim 2, further comprising:

vii. a fifth pair of opposite generally planar central panels (A1,A1) adjustable for inclination towards each other with a substantially slighter taper than said first and third pairs of panels (B1,B1;B'1,B'1) in every position thereof, said fifth pair of panels being positioned intermediate said first and third pairs of panels and bridging the space therebetween, and viii. a sixth pair of opposite generally planar central panels (A2,A2) arranged at substantially 90° with respect to said fifth pair of panels (A1,A1) and adjustable for inclination towards each other with a substantially slighter taper than said second and fourth pairs of panels (B2,B2;B'2,B'2) in every position thereof, said sixth pair of panels being positioned intermediate said second and fourth pairs of panels and bridging the space therebetween.

4. A system as claimed in claim 3, wherein all the panels are retractable to a first duct configuration of generally square cross-section and are selectively deflectable inwardly to either a second duct configuration of generally cruciform cross-section with horizontal arms longer than vertical arms, or a third duct configuration of generally cruciform cross-section with vertical arms longer than horizontal arms.

* * * * *